United States Patent
Weiss

(10) Patent No.: US 8,316,444 B2
(45) Date of Patent: Nov. 20, 2012

(54) THIRD-PARTY SOFTWARE PRODUCT CERTIFICATION

(75) Inventor: Bernhard Weiss, Bad Schoenborn (DE)

(73) Assignee: SAP AG, Walldorf (DE)

( * ) Notice: Subject to any disclaimer, the term of this patent is extended or adjusted under 35 U.S.C. 154(b) by 554 days.

(21) Appl. No.: 12/174,358

(22) Filed: Jul. 16, 2008

(65) Prior Publication Data

US 2010/0017849 A1    Jan. 21, 2010

(51) Int. Cl.
*G06F 11/00* (2006.01)

(52) U.S. Cl. ........... 726/22; 717/176; 717/168; 717/175

(58) Field of Classification Search .................... 726/22; 717/176, 168, 175
See application file for complete search history.

(56) References Cited

U.S. PATENT DOCUMENTS

| | | | |
|---|---|---|---|
| 6,427,208 B1* | 7/2002 | Jordan et al. | 713/1 |
| 6,442,754 B1* | 8/2002 | Curtis | 717/175 |
| 6,564,318 B1* | 5/2003 | Gharda et al. | 713/2 |
| 2002/0124245 A1* | 9/2002 | Maddux et al. | 717/176 |
| 2006/0048129 A1* | 3/2006 | Napier et al. | 717/168 |
| 2006/0048130 A1* | 3/2006 | Napier et al. | 717/168 |
| 2007/0220032 A1* | 9/2007 | Kapoor et al. | 707/102 |

* cited by examiner

*Primary Examiner* — Kambiz Zand
*Assistant Examiner* — Abiy Getachew
(74) *Attorney, Agent, or Firm* — Brake Hughes Bellermann LLP

(57) ABSTRACT

According to one general aspect, a method of software certification comprising establishing a host application server software (HASS) on a system. The method further comprising installing, on the system, an third-party software product (TPSP) that uses the HASS. In various embodiments, the method may also comprise verifying that the TPSP functions to at least a predefined standard. In some embodiments, the method may also include uninstalling the third-party software product. The method also including testing that the HASS functions to at least a predefined standard once the TPSP has been uninstalled.

20 Claims, 5 Drawing Sheets

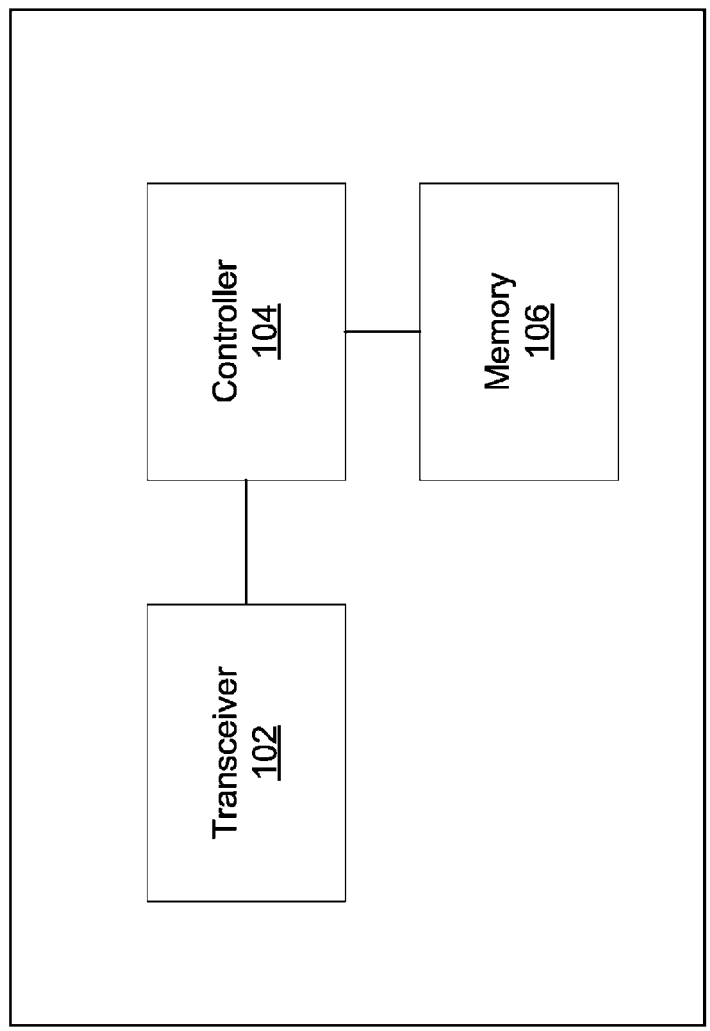

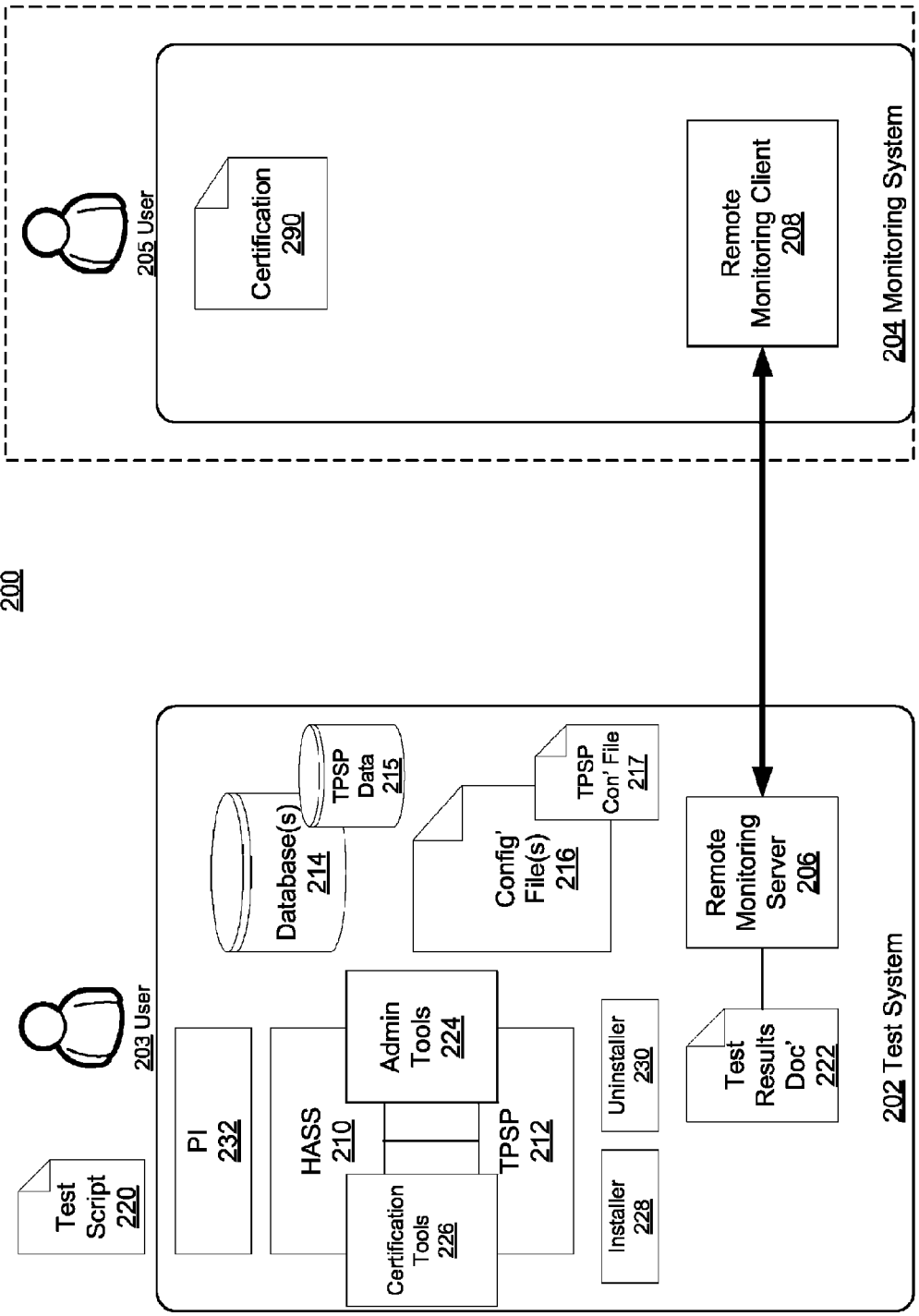

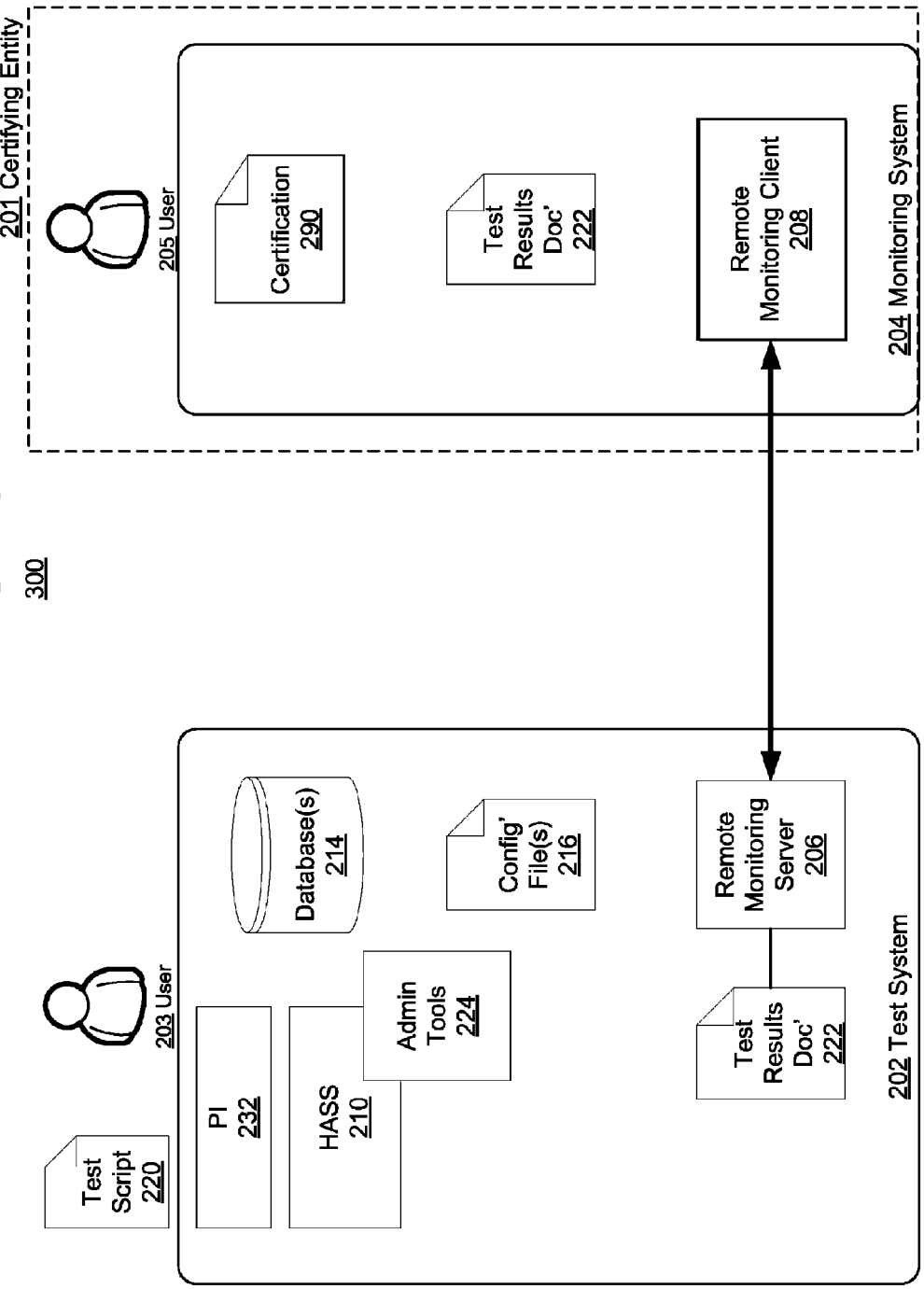

400

US 8,316,444 B2

THIRD-PARTY SOFTWARE PRODUCT CERTIFICATION

TECHNICAL FIELD

This description generally relates to software product certification, and more specifically to the certification of a third-party software product or application with a host software application server.

BACKGROUND

Product certification is generally the process of certifying that a product or application has passed a number of technical certification requirements or guidelines (e.g., functional, performance, or quality assurance tests). In some instances, certification indicates that a product is suitable for a specified purpose. Popular and common certifications may include Underwriters Laboratories (UL) that frequently tests products for safety, and the Federal Communications Commission (FCC) that frequently tests that products do not interfere with the communication spectrums. Generally certification does not guarantee that a product works flawlessly, merely that it meets a standardized set of minimum qualities.

In some instances, software may also be subjected to a certification process. For example, a server or host application may be developed that allows other software applications or modules to interact with or modify the functioning of the host software. Such additional software applications may be referred to as "add-ins", "plug-ins", "third-party software", etc. Occasionally, these additional software applications are referred to as third-party software products because they are made by someone other than the maker of the host software application. However, it is not unknown for a first-party, the host software application maker, to make add-ins for their own products.

SUMMARY

According to one general aspect, a method of software certification comprising establishing a host application server software (HASS) on a system. The method further comprising installing, on the system, a third-party software product (TPSP) that uses the HASS. In various embodiments, the method may also comprise verifying that the TPSP functions to at least a predefined standard. In some embodiments, the method may also include uninstalling the third-party software product. The method also including testing that the HASS functions to at least a predefined standard once the TPSP has been uninstalled.

According to another general aspect, a system may comprise a test system and a certifying entity. In various embodiments, the test system may include a host application server software (HASS) configured to perform a first set of functions, a removable third-party software product (TPSP), an installer configured to integrate the TPSP with the HASS, and an uninstaller configured to remove the TPSP from the test system. In some embodiments, the TPSP may be configured to interact with the HASS and perform a second set of functions. The certifying entity may be configured to verify, with the TPSP installed, the functioning of the first set of functions to at least a first predefined standard. The certifying entity may also be configured to monitor the removal of the TPSP. The certifying entity may further be configured to verify, with the TPSP removed, the functioning of the first set of functions a second predefined standard.

The details of one or more implementations are set forth in the accompanying drawings and the description below. Other features will be apparent from the description and drawings, and from the claims.

A system and/or method for certifying software, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2 is a block diagram of an example embodiment of a system in accordance with the disclosed subject matter.

FIG. 3 is a block diagram of an example embodiment of a system in accordance with the disclosed subject matter.

DETAILED DESCRIPTION

Figure 4A:
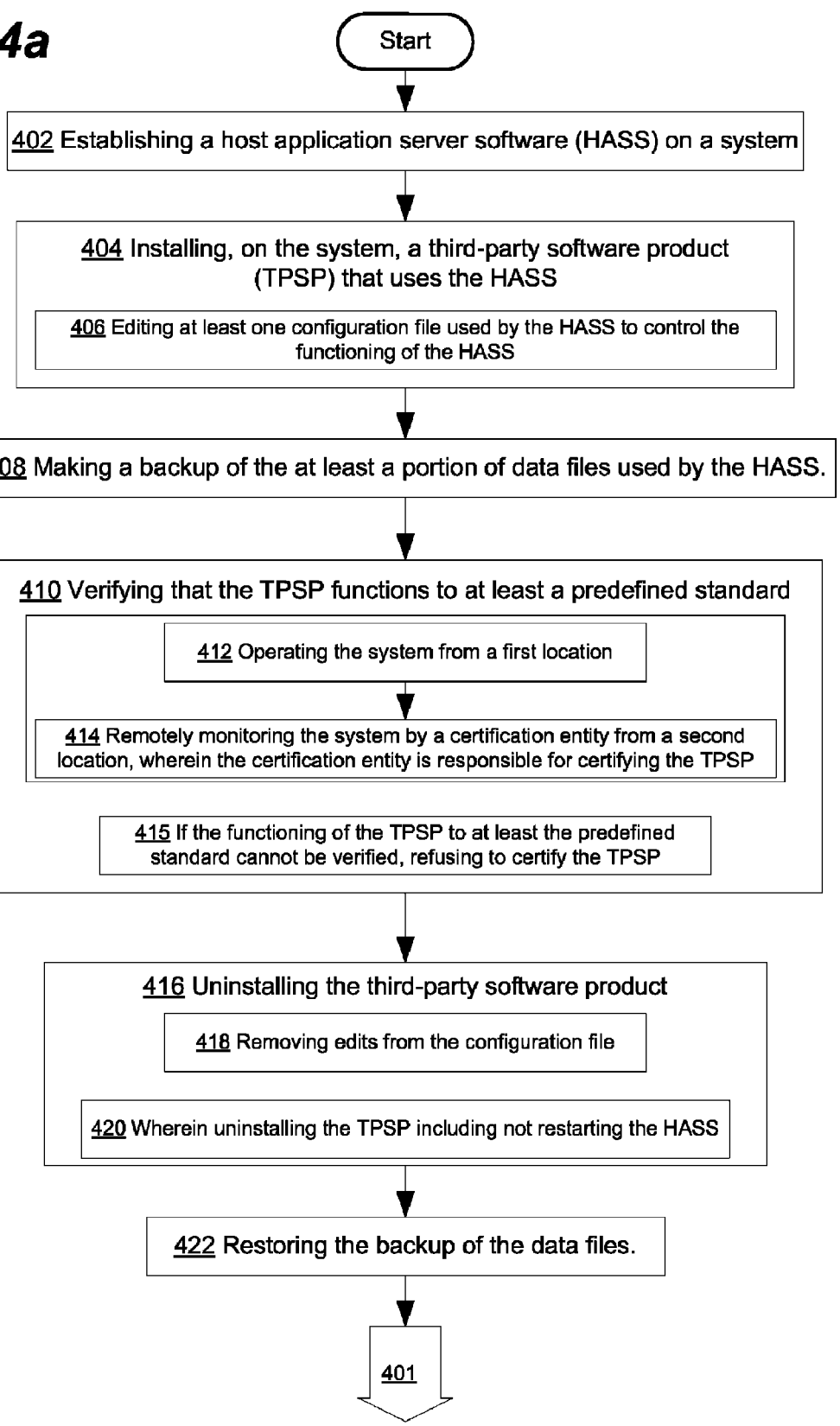
FIG. 4 is a flowchart of an example embodiment of a technique in accordance with the disclosed subject matter.

In some instances, third-party software products (TPSPs) or additional software applications (ASAs) may be certified to work with a host application server software (HASS). In various embodiments, TPSP may be written, designed or created by a third-party or other entity, (hereafter, any TPSP maker will be collectively referred to simply as "the third-party"). The HASS provider may then request that the maker of the TPSP or other certification entity verify that the TPSP technically functions and performs properly in conjunction with the HASS. This certification may be important to customers or clients who wish to add the functionality of the TPSP for their systems but do not want to disrupt or damage their existing HASS systems, once the TPSP along with any configuration changes made to HASS have been removed or reversed. In various embodiments, the certification entity may include the HASS provider. In various embodiments, the third-party software product may not be made by a third party (e.g., an add-in provided by the HASS maker); however, hereafter such a software add-in or product will be referred to as a third-part software product (TPSP) due to third-parties being responsible for the majority of such software products and the disclosed subject matter is not limited to only third-parties.

FIG. 1 is a block diagram of a device 100 in accordance with an example embodiment of the disclosed subject matter. In one embodiment, the device 100 may include a test system such as illustrated in FIGS. 2 & 3. In another embodiment, the device 100 may include a monitoring system such as those illustrated in FIGS. 2 & 3. In one embodiment, the device 100 may include a transceiver 102, a controller 104, and a memory 106. In various embodiments, the controller 104 may include a processor. In various embodiments, the transceiver 102 may be configured to communicate via at least one networking standard (e.g., WiFi, WiMAX, Ethernet, etc.). In various embodiments, the memory 106 may include permanent (e.g., compact disc, etc.), semi-permanent (e.g., a hard drive, etc.), or temporary (e.g., volatile random access memory, etc.) memory. For example, some operations illustrated and/or described herein, may be performed by a controller 104, under control of software, firmware, or a combination thereof. In another example, some components illustrated and/or described herein, may be stored in memory 106.

FIG. 2 is a block diagram of an example embodiment of a system 200 in accordance with the disclosed subject matter. In one embodiment, the system 200 may include a test system 202 and a certifying entity 201. In one embodiment, the test system 202 may include the HASS 210. In various embodiments, the HASS 210 may include a customer relationship management (CRM) system; although, it is understood that the above is merely one illustrative example to which the disclosed subject matter is not limited. In some embodiments, the HASS 210 may be compiled, interpreted, or both. In other embodiments, the HASS 210 may be written in a single computer language (e.g., Java, C#, etc.) or a plurality of computer languages. In various embodiments, the HASS 210 may be a modular design; whereas in other embodiments, the HASS 210 may include a monolithic architecture.

In various embodiments, the HASS 210 may be configured to perform a first set of functions. For example, in an embodiment that includes a CRM system, the HASS 210 may be configured to track and manage clients, sale personal, shipping schedules, etc. In various embodiments, the first set of functions may include a predetermined subset of the available functions of the HASS 210. As previously mentioned, in various embodiments, certification typically includes a set of minimum standards not an exhaustive testing of a product. In various embodiments, these first set of testable functions may be selected by the certification entity 201, negotiated by the third-party, or otherwise determined. In such an embodiment, the first set of functions may be predetermined.

In various embodiments, the test system 202 may include a basic system with a predetermined set of components. In such an embodiment, the HASS 210 may be established on the test system 202 in a known state. For example, in one embodiment, the HASS 210 may be installed on the system using the default settings for the HASS 210. Although it is contemplated that other configurations may be included within the certification process.

Likewise, in various embodiments, a plurality of test systems 202 (not shown) may be used to certify that the TPSP 212 operates and functions in a plurality of environments. In some embodiments, these multiple test systems 202 may vary by processor or controller architecture (e.g., 32-bit, 64-bit, x86, SPARC, etc.), by operating system (e.g., various Microsoft Windows versions, Apple OSX, Linux, etc.), by the configuration of the HASS 210, etc. In such an embodiment, the test system 202 may include a virtual machine. Although, it is understood that the above are merely a few illustrative examples to which the disclosed subject matter is not limited.

In various embodiments, the test system 202 may include an installer 228 configured to integrate the TPSP 212 with the HASS 210. In various embodiments, the installer 228 may be used to install the TPSP 212 on the test system 202. In some embodiments, the installer 228 may be used or controlled by a test system user 203 or the certifying entity user 205. In other embodiments, the installer 228 may be automated. In various embodiments, the installation of the TPSP 212 may be part of the certification process.

In various embodiments, the test system 202 may include a TPSP 212. In some embodiments, the TPSP 212 may be installed or integrated with the HASS 210 during the certification process. In such an embodiment, the TPSP 212 may be included into the test system 202 at this point. In other embodiments, the TPSP 212 may be included in the test system 202, just not integrated with the HASS 210; for example, the TPSP 212 may be on a hard drive awaiting installation.

In various embodiments, the TPSP 212 may provide additional functionality to the test system 202. In some embodiments, the TPSP 212 may alter the functionality of the HASS 210. In various embodiments, the TPSP 212 may be configured to interact with the HASS 210 and provide a second set of functions. For example, in the specific embodiment above in which the HASS 210 includes a CRM system, the TPSP 212 may track hourly billing and other consulting tasks; although, it is understood that the above are merely a few illustrative examples to which the disclosed subject matter is not limited.

In various embodiments, the TPSP 212 may be written in a variety of languages (e.g., Java, C++, Perl, etc.), either homogeneously or heterogeneously. In one embodiment, the TPSP 212 may be modular, monolithic, or a combination thereof.

In one embodiment, the certifying entity 201 may be configured to verify that, with the TPSP 212 installed, the first set of functions may be performed to at least a first predetermined standard. In another embodiment, the certifying entity 201 may be configured to verify that, with the TPSP 212 installed, the second set of functions may be performed to at least a predetermined standard, either the first standard or another standard. As stated above, in various embodiments, the certifying entity 201 may be the maker of the HASS 210, an independent entity, etc. Furthermore, in various embodiments, the predetermined standard may be solely determined by the certifying entity 201, negotiated with the TPSP 212 maker, or determined via another scheme. In various embodiments, the first predetermined standard may be part of a larger testing or certification standard.

In various embodiments, the testing of the set of functions may be manually performed by the test system user 203 or, in another embodiment, the monitoring user 205. In yet another embodiment, the testing may be automated, via one or more of tools included within the test system 202. In various embodiments, the testing may conform to or be aided by a test script 220. In such an embodiment, the test script 220 may dictate the actions of the user 203 (or testing agent) such that all desired aspects of the first predetermined standards are tested.

In some embodiments, the testing and/or verification of the proper functioning based upon the predetermined standard may include the use of certification tools 226. In various embodiments, these certification tools 226 may be included as part of the test system 202. In some embodiments, the certification tools 226 may be included as part of the HASS 210, TPSP 212, or a combination thereof. In various embodiments, these certification tools 226 may be configured to aid the verification of the functioning of the HASS 210 and/or the TPSP 212 to the various predefined standard(s) used for certification. In various embodiments, these certification tools 226 may compare the actual results of a test to the expected results. In another embodiment, the certification tools 226 may simply report the actual results to the testing agent (e.g., user 203), and leave it to the testing agent to compare the actual versus expected results. In various embodiments, the certification tools 226 may be special purpose tools to aid the testing. Wherein in other embodiments, the certification tools 226 may be normal aspects of the HASS 210 or TPSP 212. In some embodiments, the certification tools 226 may include both special purpose tools and aspects of the HASS 210 and/or TPSP 212.

In various embodiments, the testing and/or verification of the proper functioning based upon a predetermined standard may include the use of administration tools 224. In various embodiments, the certification tools 226 may include the administration tools 224, or vice versa. In such an embodiment, the administration tools 224 may include tools generally configured to perform system administration tasks on the HASS 210, TPSP 212, or the test system 202 itself, although, it is understood that the above are merely a few illustrative examples to which the disclosed subject matter is not limited.

For example, an operating system tool used to check the status of servers, daemons, etc. may be used to test and/or verify the proper functioning (based on the predefined standard) of the HASS 210 or TPSP 212.

In various embodiments, the testing of the predefined standards may include documenting the results of the various tests, in one embodiment these tests may be dictated by the test script 220. In various embodiments, such documentation may be included within a test results document(s) 222. In some embodiments, the test results documentation 222 may be included as part of the test system 202. In various embodiments, the documenting of the functionality of the HASS 210 or the TPSP 212 may include taking a number of screenshots of the user interface of the HASS 210 or TPSP 212, or, in another embodiment, screenshots of the certification tools 226 or administrative tools 224, etc.

In various embodiments, the certification entity 201 may monitor and verify the testing or other aspects of the test system 202 from a remote location. In such an embodiment, the certification entity 201 may include a monitoring system 204. In various embodiments, the monitoring system 204 may include a remote monitoring client 208 that sends and receives information from the test system 202. In such an embodiment, the test system 202 may include a remote monitoring server 206 configured to facilitate the monitoring of the test system by a remote system (e.g., the monitoring system 204). In various embodiments, the server/client relationship may be reversed, in that the certification entity 201 may maintain a server that the test system 202 contacts. In one embodiment, the remote monitoring client 208 may be configured to display to a user 203 the operations of the test system 202. In various embodiments, the monitoring system 204 may display the user interface or a copy of the screen display of the test system 202. In other embodiments, the monitoring system 204 may display a customized monitoring interface (e.g., showing memory values, data logs, etc.) that are not normally displayed to a user 203 of test system 202. In some embodiments, a combination of the two may be used.

In such an embodiment, the certifying entity 201 may be physically remote, sometimes very remote, to the test system 202. For example, the certifying entity 201 may be located in Germany, whereas the test system 202 may be physically located in Argentina. In another embodiment, the tests system 202 may include a plurality of systems interspersed in a variety of physical locations. In such an embodiment, the use of remote monitoring may allow certification without the costly expense of travelling. In various embodiments, remote monitoring may allow for the recording of an automated testing and the later review by the certification entity 201. In such an embodiment, the testing may occur at a first time (e.g., afternoon Argentina time) and the verification may occur at a second time (e.g., the next morning Germany time).

In one embodiment, the certification process may include uninstalling the TPSP 212 from the test system 202. In such an embodiment, the test system 202 may include an uninstaller 230 configured to remove or undeploy the TPSP 212 from the test system 202. FIG. 3 is a block diagram of an example embodiment of a system 300 in accordance with the disclosed subject matter, when the TPSP 212 has been uninstalled.

In various embodiments, removing the TPSP 212 may include not restarting the HASS 210. This may be an important test, for example, in embodiments in which the HASS 210 is expected to have a significant "up time" requirement (e.g., 24/7 availability, or 99.9999% up-time). Such a system may include highly reliable systems whose unavailability, even temporary unavailability, would be seen as a very negative or undesirable outcome. Although, it is understood that the above are merely a few illustrative examples to which the disclosed subject matter is not limited. In various embodiments, the certifying entity 201 may monitor the removal of the TPSP 212. In some embodiments, a variety of tests may be performed to confirm that the TPSP 212 has been sufficiently removed, and documentation 222 may reflect these tests.

In various embodiments, after the removal of the TPSP 212, testing may occur to verify that he first set of functions provided by the HASS 210 continue to perform as demanded by the predefined set of standards. In one embodiment, the predefined set of standards may include the first predefined set of standards. In other embodiments, a second set of predefined standards may be used that are less than, greater than, or different from the first set of predefined standards, or a combination thereof. In various embodiments, these tests and the performance of the HASS 210 or tests system 202 may be verified by the certification entity 201. In such an embodiment, the verification may occur remotely, as described above. In various embodiments, the testing may be performed by the test system user 203, the certifying user 205, or a combination thereof.

In various embodiments, the testing and verification may include the use of the certification tools 226 and/or the administrative tools 224, as described above. In the embodiment illustrated by FIG. 3, the certification tools 226 may be uninstalled with the TPSP 212 leaving the administrative tools 224 for testing and certification, although other embodiments are possible. In various embodiments, such testing may include, certifying that the TPSP 212 is not running, that no error and/or warning messages are created due to the lack of the TPSP 212, etc.; although, it is understood that the above are merely a few illustrative examples to which the disclosed subject matter is not limited.

In various embodiments, the test system 202 may include one or more databases 214 that may be used by the HASS 210. In some embodiments, the database 214 may be included in other systems outside or external to the test system 202. For example, the HASS 210 may access a remote database. In other embodiments, the databases 214 may include a plurality of data files, a monolithic data file, or a combination thereof. In various embodiments, the HASS 210 may read and/or write to the database 214.

In the course of testing during a period of time in which the TPSP 212 is installed on the system 202, in one embodiment, the TPSP 212 may modify or edit the database 214. In various embodiments, the TPSP 212 may create new databases (e.g., TPSP database 215). In various embodiments, the editing may include simply changing data values within the database 214. In another embodiment, the editing may include adding or deleting fields from the database 214. For example, the original HASS 210 database 214 format may include the fields "First Name", and "Last Name". This database may be populated with values corresponding to these fields. The TPSP 212 may add the field "Middle Name" to the data base 214. Although, it is understood that the above are merely a few illustrative examples to which the disclosed subject matter is not limited.

In one embodiment, the certification process may include making a backup of part or all of these database files 214 and/or 215, while the TPSP 212 is installed on the test system 202. After the TPSP 212 has been removed, this backup may be restored to the test system 202. The HASS 210, the set of functions provided by the HASS 210, or a subset thereof, may then be tested to determine if they meet the predefined standard of performance of functionality even with the TPSP 212 altered database 214 or the additional database 215. Continuing the above example, the tests may determine if the HASS 210 can continue to properly function (as defined by the standard) with a "Middle Name" field in the database 214; although, it is understood that the above is merely one illustrative example to which the disclosed subject matter is not limited.

In various embodiments, the test system 202 may include one or more configuration file(s) 216 that may be used by the HASS 210. In such an embodiment, the configuration files 216 may be configured to store data that dictates the way the HASS performs the first set of functions. In some embodiments, the configuration file(s) 216 may be included in other systems outside or external to the test system 202. For example, the HASS 210 may access a remote configuration file. In other embodiments, the configuration file(s) 216 may include a plurality of data files, a monolithic data file, or a combination thereof. In various embodiments, the HASS 210 may read and/or write to the configuration file(s) 216.

In the course of testing during a period of time in which the TPSP 212 is installed on the system 202, the TPSP 212, in one embodiment, may modify or edit the configuration files 216. In some embodiments, these edits may dictate the way the TPSP 212 performs the second set of functions, or, in one embodiment, the HASS 210 performs the first set of functions. In various embodiments, the TPSP 212 may create new configuration file(s) (e.g., TPSP configuration files 217). In various embodiments, the editing may include simply changing data values within the configuration files 216. In another embodiment, the editing may include adding or deleting fields from the configuration files 216, similarly to that described above regarding the databases. Although, it is understood that the above are merely a few illustrative examples to which the disclosed subject matter is not limited.

In one embodiment, the uninstaller 230 may be configured to remove any TPSP configuration files 217, added fields, edits made by the TPSP 212, or a combination thereof. In one embodiment, the uninstaller 230 may be configured to only remove edits that dictate the way the TPSP 212 performs the second set of functions, and leave any edits related to the HASS 210 and the first set of functions. In other embodiments, the installer 230 or other tool (e.g., the TPSP 212) may track which changes were made via the TPSP 212 and which were not and only remove those made by the TPSP 212.

In one embodiment, the certification process may include, after the TPSP 212 has been uninstalled, testing and verifying that the HASS 210 performs the first set of functions to the predefined standard regardless of the edits made to the configuration files 216. In one embodiment, the configuration file 216 may include the edits made by the TPSP 212. In another embodiment, the configuration file 216 may have had some or all of the edits removed, as described above. In yet another embodiment, the configuration file 216 may not have been edited by the TPSP 212 but instead any changes may have been recorded in separate TPSP configuration files 217. In various embodiments, the certifying entity 201 may monitor these tests, remotely or locally, as described above.

In various embodiments, the HASS 210 and/or the TPSP 212 may make use a program interpreter (PI) 232 to run, in whole or part. In various embodiments, the PI 232 may interpret compiled software (e.g., a Java or C# virtual machine, etc.) or un-compiled code (e.g., a Perl or shell script compiler, etc.). In some embodiments, the PI 232 may include an interrupter for the Enterprise Edition of the Java Platform™ (e.g., J2EE/EE5™ application server). In such an embodiment, the TPSP 212 may edit or alter the configuration files (not shown) of the PI 232, similarly to those described above. In various embodiments, these alterations may change the way in which the PI 232 executes the HASS 210 and the TPSP 212. In various embodiments, the TPSP 212 may install a PI 232 in order to execute the TPSP 212.

In various embodiments, the certification process may include, after the TPSP 212 has been uninstalled, testing and verifying that the HASS 210 performs the first set of functions to the predefined standard regardless of the edits made to the configuration files of the PI 232. In some embodiments, the certification process may include, after the TPSP 212 has been uninstalled, testing and verifying that the HASS 210 performs the first set of functions to the predefined standard regardless of the installation of the PI 232 in order to execute the TPSP 212. In one embodiment, the uninstaller 230 may be configured to remove any added fields, edits made by the TPSP 212, or a combination thereof. In some embodiments, the uninstaller 230 may be configured to uninstall the PI 232. In various embodiments, the certifying entity 201 may monitor these tests, remotely or locally, as described above.

In one embodiment, the HASS 210 may be configured to be stopped and/or restarted with or without restarting the test system 202 as a whole. In such an embodiment, the certification process may include stopping or restarting the HASS 210, after the TPSP 212 has been uninstalled or undeployed. In various embodiments, the stopping or restarting of the HASS 210 may occur even though the uninstalling of the TPSP 212 may not require the HASS 210 to be stopped or restarted. In such an embodiment, the HASS 210 restarting may be a separate test or tests from the un-installation of the TPSP 212. In various embodiments, the predetermined standard may include testing the HASS 210 to determine if it may be stopped and/or restarted without the TPSP 212 installed. In one embodiment, the certification may include testing and verifying that the first set of functions continues to perform to the predetermined standard after the HASS 210 has been stopped and restarted.

FIG. 3 is a block diagram of an example embodiment of a system 300 in accordance with the disclosed subject matter. In various embodiments, the system 300 may show the test system 202 at the end of the certification process, after the TPSP 212 has been uninstalled. In such an embodiment, the test results documentation 222 may be transferred or copied from the test system 202 to the monitoring system 204. In such an embodiment, the remote monitoring server 206 and client 208 may facilitate this transmission.

In various embodiments, if the testing system 202 has performed all tests dictated by the test script 220, to the predefined standard, the certifying entity 201 may issue a certification 290 to the TPSP 212. In some embodiments, the certification may be withheld or refused if the predefined standard was not met; for example, the HASS 210 or TPSP 212 may not perform the first or second set of functions, respectively, as required. In another embodiment, if the HASS 212 performs the first set of functions according to the predetermined standard once the TPSP 212 has been removed, the certifying entity 201 may certify the TPSP 212. In various embodiments, if during any step in the certification process the predefined standard is not met, the rest of the process may be aborted and the certification withheld.

Figure 4B:
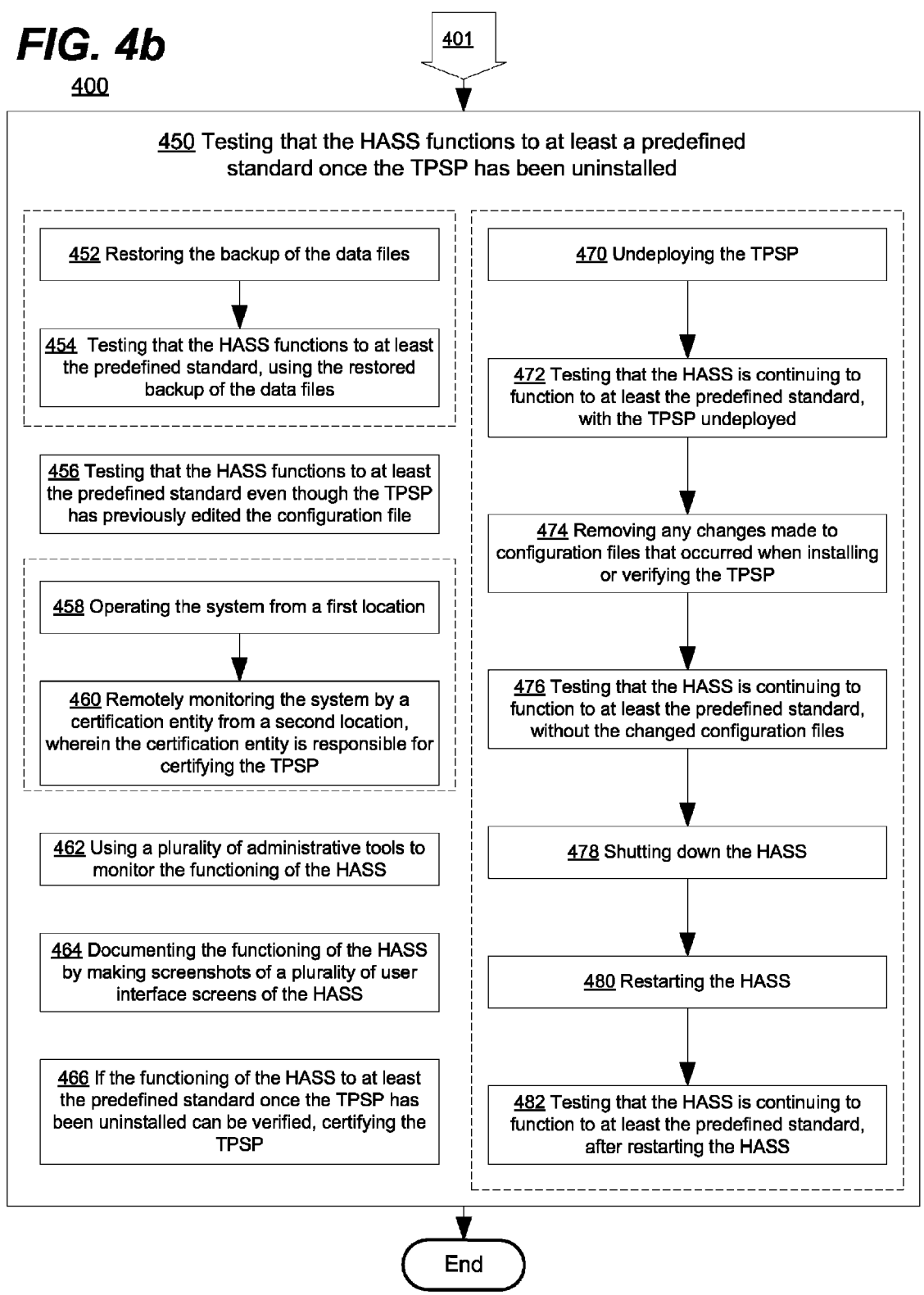

FIG. 4 is a flowchart of an example embodiment of a technique 400 in accordance with the disclosed subject matter. In various embodiments, parts or all of the technique 400 may be the results of the operations of the system 200 of FIG. 2 or system 300 of FIG. 3. Although, it is understood that other systems and timing diagrams may produce technique 400. Furthermore, it is understood that FIGS. 4a and 4b represent a single flowchart illustrated on multiple pages and connected via the connectors of Block 401, here-before and here after the multiple pages will simply be referred to as FIG. 4.

Block 402 illustrates that, in one embodiment, a host application server software (HASS) may be established on a system, as described above. In various embodiments, the user 203 of FIG. 2 may establish a HASS 210 on a tests system 202, as described above. In various embodiments, establishing may include acquiring a system that includes the HASS or, in another embodiment, installing the HASS on a system; although, it is understood that the above are merely a few illustrative examples to which the disclosed subject matter is not limited.

Block 404 illustrates that, in one embodiment, 404 an third-party software product (TPSP) that uses the HASS may be installed on the system, as described above. In one embodiment, the controller 104 of FIG. 1 or the installer 228 of FIG. 2 may perform this action, as described above.

Block 406 illustrates that, in one embodiment, installing may include editing at least one configuration file used by the HASS to control the functioning of the HASS. In one embodiment, the configuration file 216 of FIG. 2 may be edited, as described above. In another embodiment, the TPSP edit a separate configuration file (e.g., configuration file 217), as described above. In various embodiments, the controller 104 of FIG. 1, the TPSP 212, or the installer 228 of FIG. 2 may perform this action, as described above.

Block 408 illustrates that, in one embodiment, a backup may be made 408 of the at least a portion of data files used by the HASS, as described above. In one embodiment, the memory 106 of FIG. 1 or the database 214 of FIG. 2 may be backed-up, as described above. In various embodiments, the controller 104 of FIG. 1, or the user 203 of FIG. 2 may perform this action, as described above.

Block 410 illustrates that, in one embodiment, it may be verified that the TPSP functions to at least a predefined standard, as described above. In another embodiment, the functioning of the HASS may be verified to at least a predefined standard, as described above. In various embodiments, the testing may be performed by a first entity (e.g., user 203 of FIG. 2), whereas the verification may be performed by a second entity (e.g., certification entity 201), as described above. In other embodiments, both testing and verifying may be performed by the first entity (e.g., user 203 of FIG. 2), and a formal verification may be performed by the second entity (e.g., certification entity 201), as described above.

Block 412 illustrates that, in one embodiment, verifying may include operating the system from a first location, as described above. In one embodiment, the user 203 of FIG. 2 may perform this action, as described above. Block 414 illustrates that, in one embodiment, verifying may include remotely monitoring the system by a certification entity from a second location, as described above. In such an embodiment, the certification entity may be responsible for certifying the TPSP, as described above. Block 415 illustrates that, in one embodiment, if the functioning of the TPSP or, in one embodiment, the HASS cannot be verified to at least the predefined standard, the certifying entity may refuse to certify the TPSP, as described above. In one embodiment, the certifying entity 201 of FIG. 2 may perform this action, as described above.

Block 416 illustrates that, in one embodiment, the TPSP may be uninstalled, as described above. Block 418 illustrates that, in one embodiment, uninstalling may include removing edits from the configuration file, as described above. Block 420 illustrates that, in one embodiment, uninstalling may include not restarting the HASS, as described above. In various embodiments, the controller 104 of FIG. 1, the uninstaller 230 of FIG. 2, or the user 203 of FIG. 2 may perform these actions, as described above.

Block 422 illustrates that, in one embodiment, the previously backed-up of the data files (from Block 408) may be restored, as described above. In one embodiment, the memory 106 of FIG. 1 or the database 214 of FIG. 2 may be restored, as described above. In various embodiments, the controller 104 of FIG. 1, or the user 203 of FIG. 2 may perform this action, as described above.

Block 450 illustrates that, in one embodiment, once the TPSP has been uninstalled (see Block 416), the HASS functions may be tested to determine if they perform to at least a predefined standard, as described above. In various embodiments, the testing may be performed by a first entity (e.g., user 203 of FIG. 2), whereas the verification may be performed by a second entity (e.g., certification entity 201), as described above. In various embodiments, testing may include verifying.

Block 452 illustrates that, in one embodiment, testing may include restoring the backup of the data files, as described above. Block 454 illustrates that, in one embodiment, testing may also include testing that the HASS functions to at least the predefined standard, using the restored backup of the data files, as described above.

Block 456 illustrates that, in one embodiment, testing may include testing that the HASS functions to at least the predefined standard even though the TPSP has previously edited the configuration file, as described above. In various embodiments, the testing may be performed by the user 203 of FIG. 2 or the certifying entity 201, as described above.

Block 458 illustrates that, in one embodiment, testing may include operating the system from a first location, as described above. In one embodiment, the user 203 of FIG. 2 may perform this action, as described above. Block 460 illustrates that, in one embodiment, testing may include remotely monitoring the system by a certification entity from a second location, wherein the certification entity is responsible for certifying the TPSP, as described above. In one embodiment, the certifying entity 201 of FIG. 2 may perform this action, as described above.

Block 462 illustrates that, in one embodiment, testing may include using a plurality of administrative tools to monitor the functioning of the HASS, as described above. In one embodiment, the administrative tools 224 for FIG. 2 or the controller 104 of FIG. 1 may perform this action, as described above.

Block 464 illustrates that, in one embodiment, testing may include documenting the functioning of the HASS by making screenshots of a plurality of user interface screens of the HASS, as described above. In various embodiments, the user 203 of FIG. 2 or the certifying entity 201 may perform this action, as described above.

Block 466 illustrates that, in one embodiment, testing may include, if the functioning of the HASS to at least the predefined standard once the TPSP has been uninstalled can be verified, certifying the TPSP, as described above. In various embodiments, the certifying entity 201 of FIG. 2 may perform this action, as described above.

Block 470 illustrates that, in one embodiment, testing may include undeploying the TPSP, as described above. In various embodiments, the action of Block 470 may be included within Block 416. In other embodiments, the undeploying may include indicating to the HASS that the TPSP is no longer installed. Block 472 illustrates that, in one embodiment, testing may include subsequently testing that the HASS is continuing to function to at least the predefined standard, with the TPSP undeployed, as described above. In various embodiments, the user 203 of FIG. 2 or the certifying entity 201 may perform these actions, as described above.

Block 474 illustrates that, in one embodiment, testing may include removing any changes made to configuration files that occurred when installing or verifying the TPSP, as described above. Block 476 illustrates that, in one embodiment, testing may include subsequently testing that the HASS is continuing to function to at least the predefined standard, without the changed configuration files, as described above. In various embodiments, the user 203 of FIG. 2 or the certifying entity 201 may perform these actions, as described above.

Block 478 illustrates that, in one embodiment, testing may include shutting down the HASS, as described above. Block 480 illustrates that, in one embodiment, testing may include restarting the HASS, as described above. Block 482 illustrates that, in one embodiment, testing may include subsequently testing that the HASS is continuing to function to at least the predefined standard, after restarting the HASS, as described above. In various embodiments, the user 203 of FIG. 2 or the certifying entity 201 may perform these actions, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of software certification comprising:
   establishing a host application server software (HASS) on a system having a memory and a processor;
   installing, within the memory of the system, a third-party software product (TPSP) that includes machine-executable instructions and, after installation, is integrated with the HASS;
   verifying, when the instructions included by the TPSP are executed by the processor, that the TPSP functions to at least a predefined standard;
   uninstalling the third-party software product;
   testing, when executing the HASS by the processor of the system, that the HASS functions to at least a predefined standard once the TPSP has been uninstalled; and
   issuing a certification to the TPSP if both the TPSP and the HASS function at least to the respective predefined standards.

2. The method of claim 1 wherein the host application server software is configured to read and write to a plurality of data files;
   further including, during a period in which the third-party software product is installed, making a backup of the at least a portion of the data files; and
   wherein testing includes:
     restoring the backup of the data files, and
     testing that the HASS functions to at least the predefined standard, using the restored backup of the data files.

3. The method of claim 1 wherein installing includes editing at least one configuration file used by the HASS to control the functioning of the HASS; and
   wherein testing includes testing that the HASS functions to at least the predefined standard even though the TPSP has previously edited the configuration file.

4. The method of claim 3 wherein uninstalling the TPSP includes removing edits from the configuration file.

5. The method of claim 1 wherein the verifying and testing both include:
   operating the system from a first location, and
   remotely monitoring the system by a certification entity from a second location; and
   wherein the certification entity is responsible for certifying the TPSP.

6. The method of claim 1 wherein testing includes:
   undeploying the TPSP;
   testing that the HASS is continuing to function to at least the predefined standard, with the TPSP undeployed;
   removing any changes made to configuration files that occurred when installing or verifying the TPSP;
   testing that the HASS is continuing to function to at least the predefined standard, without the changed configuration files;
   shutting down the HASS;
   restarting the HASS; and
   testing that the HASS is continuing to function to at least the predefined standard, after restarting the HASS.

7. The method of claim 1 wherein testing includes:
   using a plurality of administrative tools to monitor the functioning of the HASS.

8. The method of claim 1 wherein testing includes:
   documenting the functioning of the HASS by making screenshots of a plurality of user interface screens of the HASS.

9. The method of claim 1 wherein uninstalling the TPSP including not restarting the HASS.

10. The method of claim 1 wherein verifying includes, if the functioning of the TPSP to at least the predefined standard cannot be verified, refusing to certify the TPSP; and
    wherein testing includes, if the functioning of the HASS to at least the predefined standard once the TPSP has been uninstalled can be verified, certifying the TPSP.

11. A system comprising:
    a test system including:
      a memory and a processor,
      a host application server software (HASS) configured to, when executed by the processor, perform a first set of functions,
      a removable third-party software product (TPSP) that includes machine-executable instructions and is configured to, when executed by the processor:
        interact with the HASS and perform a second set of functions,
      an installer configured to integrate the TPSP with the HASS, and
      an uninstaller configured to remove the TPSP from the test system; and
    a certifying entity configured to:
      verify, with the TPSP installed, the functioning of the first set of functions to at least a first predefined standard,
      monitor the removal of the TPSP,
      verify, with the TPSP removed, the functioning of the first set of functions a second predefined standard, and
      issue a certification to the TPSP if, both the TPSP installed and removed, the first set of functions function at least to the respective predefined standards.

12. The system of claim 11 wherein the test system includes at least one database configured to store data used by the HASS and the TPSP; and
    wherein the certifying entity is configured to: create a backup of the database before the removal of the TPSP, after the removal of the TPSP, restore the backup of the database, and
    verify that the first set of functions performs to at least the second predefined standard with the TPSP removed and the back of the data base restored.

13. The system of claim 11 wherein the test system includes at least one configuration file configured to store data that dictates the way the HASS performs the first set of functions;
    wherein the TPSP is configured to edit the configuration file to include data that dictates the way the TPSP performs the second set of functions; and
    wherein the certifying entity is configured to:
    verify that the first set of functions to at least the second predefined standard, with the TPSP removed and the configuration file still including the data that dictates the way the TPSP performs the second set of functions.

14. The system of claim 11 wherein the test system includes at least one configuration file configured to store data that alters the way the HASS performs the first set of functions;
    wherein the TPSP is configured to edit the configuration file to include data that alters the way the TPSP performs the second set of functions; and
    wherein the uninstaller is configured to remove any data that alters the way the TPSP performs the second set of functions from the configuration file.

15. The system of claim 11 wherein test system includes a remote monitoring server configured to facilitate the monitoring of the test system by a remote system; and
    wherein the certifying entity includes a monitoring system including a remote monitoring client configured to display to a user the operations of the test system.

16. The system of claim 15 further including a local user configured to locally operate the test system; and
    wherein operate the test system includes:
    test that the first set of functions performs to the first set of standards with the TPSP installed,
    remove the TPSP from the test system, and
    test that the first set of functions performs to the second set of standards with the TPSP removed.

17. The system of claim 11 wherein the test system includes a plurality of administrative tools configured to:
    test the proper functioning of the first set functions,
    determine whether or not the TPSP is installed, and
    stop and start the HASS.

18. The system of claim 11 wherein the uninstaller is configured to remove the TPSP without restarting the HASS.

19. The system of claim 11 further including:
    at least one certification tool configured to test the first set of functions; and
    a test result document configured to report the results of the test performed by the certification tool.

20. The system of claim 11 wherein the certifying entity is configured to certify the compatibility of the TPSP with the HASS.

* * * * *